(12) United States Patent
Jeung

(10) Patent No.: US 8,004,141 B2
(45) Date of Patent: Aug. 23, 2011

(54) TWO-PHASE BRUSHLESS DC MOTOR

(75) Inventor: Young-Chun Jeung, Uiwang-si (KR)

(73) Assignee: SNTech Inc., Phoenix, AZ (US)

( * ) Notice: Subject to any disclaimer, the term of this patent is extended or adjusted under 35 U.S.C. 154(b) by 595 days.

(21) Appl. No.: 11/210,886

(22) Filed: Aug. 25, 2005

(65) Prior Publication Data

US 2006/0244333 A1      Nov. 2, 2006

(30) Foreign Application Priority Data

Apr. 29, 2005   (KR) .......................... 10-2005-035861

(51) Int. Cl.
*H02K 21/12* (2006.01)
*H02K 21/00* (2006.01)
*H02K 29/00* (2006.01)
*H02K 3/20* (2006.01)
*H02K 17/28* (2006.01)
*H02K 19/26* (2006.01)

(52) U.S. Cl. .................. 310/186; 310/180; 310/156.45; 310/168; 310/216.104; 310/216.099; 310/185; 310/269; 310/68 B; 310/68 R; 318/696; 318/701

(58) Field of Classification Search .................. 310/186, 310/180, 156.45, 168, 156.01, 68 B, 216, 310/296; 318/701, 254, 599, 696; *H02K 21/12, H02K 1/10, 21/00, 29/00, 3/16, 3/20, 17/28, H02K 19/26*

See application file for complete search history.

(56) References Cited

U.S. PATENT DOCUMENTS

| | | |
|---|---|---|
| 2,192,985 A | 3/1940 | Reis |
| 2,488,729 A | 11/1949 | Kooyman |
| 3,246,187 A | 4/1966 | Iemura |
| 3,299,335 A * | 1/1967 | Wessels ..................... 318/400.4 |
| 3,444,406 A | 5/1969 | Aha |
| 3,457,486 A | 7/1969 | Soeda |
| 3,531,702 A | 9/1970 | Hill |
| 3,604,960 A | 9/1971 | Krestel |
| 3,787,014 A | 1/1974 | Story et al. |
| 3,878,809 A | 4/1975 | Ray |
| 3,909,647 A | 9/1975 | Peterson |
| 4,004,202 A | 1/1977 | Davis |
| 4,093,906 A | 6/1978 | Draxler |
| 4,271,385 A | 6/1981 | Azusawa |
| 4,384,224 A | 5/1983 | Spitler et al. |

(Continued)

FOREIGN PATENT DOCUMENTS

EP      1050946 A2      11/2000

(Continued)

*Primary Examiner* — Quyen Leung
*Assistant Examiner* — John K Kim
(74) *Attorney, Agent, or Firm* — Knobbe Martens Olson & Bear LLP

(57) ABSTRACT

The present invention relates to a two-phase brushless DC motor which can increase a pemerance coefficient of a rotor to the maximum to thereby improve efficiency and starting feature of the motor, and to reduce torque ripple and noise thereof. The brushless motor of the present invention includes a two-phase winding stator having 4×n winding poles and auxiliary poles provided between the winding poles, and a rotor constituted by 6×n permanent magnet rotating poles having divided angle. Auxiliary poles between the stator poles can be provided. The two-phase brushless motor of the present invention can be driven by a control device for the two-phase motor which can transform electric power and rectify electronically.

13 Claims, 4 Drawing Sheets

U.S. PATENT DOCUMENTS

| | | | |
|---|---|---|---|
| 4,389,606 A | 6/1983 | Detering | |
| 4,544,856 A | 10/1985 | King | |
| 4,587,450 A | 5/1986 | Ozaki | |
| 4,642,885 A | 2/1987 | King | |
| 4,668,898 A | 5/1987 | Harms et al. | |
| 4,712,030 A | 12/1987 | Lakin et al. | |
| 4,745,318 A | 5/1988 | Ivanics | |
| 4,774,448 A * | 9/1988 | Yoshitomi | 318/746 |
| 4,874,975 A * | 10/1989 | Hertrich | 310/186 |
| 4,888,530 A * | 12/1989 | Radik et al. | 318/400.38 |
| 4,954,736 A | 9/1990 | Kawamoto et al. | |
| 5,200,662 A | 4/1993 | Tagami et al. | |
| 5,223,761 A * | 6/1993 | Larsen | 310/216.059 |
| 5,237,737 A | 8/1993 | Zigler et al. | |
| 5,243,732 A | 9/1993 | Koharagi et al. | |
| 5,345,130 A | 9/1994 | Kliman et al. | |
| 5,492,273 A | 2/1996 | Shah | |
| 5,500,994 A | 3/1996 | Itaya | |
| 5,528,095 A | 6/1996 | Strobl | |
| 5,559,407 A | 9/1996 | Dudley et al. | |
| 5,663,616 A | 9/1997 | Stringfellow et al. | |
| 5,680,021 A | 10/1997 | Hollenbeck | |
| 5,739,614 A * | 4/1998 | Suzuki et al. | 310/180 |
| 5,767,635 A | 6/1998 | Steffens et al. | |
| 5,801,463 A * | 9/1998 | Suzuki et al. | 310/51 |
| 5,818,194 A | 10/1998 | Nordby | |
| 5,929,589 A * | 7/1999 | Suzuki et al. | 318/685 |
| 6,005,320 A | 12/1999 | Kim et al. | |
| 6,034,455 A | 3/2000 | Goltz et al. | |
| 6,081,013 A | 6/2000 | Narita | |
| 6,209,622 B1 | 4/2001 | Lagace et al. | |
| 6,310,452 B1 | 10/2001 | Deck et al. | |
| 6,329,736 B1 * | 12/2001 | Bernauer et al. | 310/429 |
| 6,351,091 B1 * | 2/2002 | Heinkel et al. | 318/400.11 |
| 6,369,536 B2 | 4/2002 | Beifus et al. | |
| 6,376,954 B1 | 4/2002 | Nunes, Jr. | |
| 6,404,086 B1 | 6/2002 | Fukasaku et al. | |
| 6,441,521 B1 | 8/2002 | Dombrovski et al. | |
| 6,462,440 B1 | 10/2002 | Asao et al. | |
| 6,603,231 B2 | 8/2003 | Dombrovski et al. | |
| RE38,406 E | 1/2004 | Faris et al. | |
| 6,700,297 B2 | 3/2004 | Hsu et al. | |
| 6,718,617 B2 | 4/2004 | Drexlmaier | |
| 6,765,319 B1 | 7/2004 | Thompson | |
| 6,791,222 B1 | 9/2004 | Maslov et al. | |
| 6,801,013 B2 | 10/2004 | Woodward et al. | |
| 6,864,657 B1 * | 3/2005 | Lungu | 318/701 |
| 6,891,306 B1 | 5/2005 | Soghomonian et al. | |
| 6,924,611 B1 | 8/2005 | Tzeng et al. | |
| 6,952,088 B2 | 10/2005 | Woodward et al. | |
| 7,015,663 B1 | 3/2006 | Tzeng et al. | |
| 7,042,180 B2 | 5/2006 | Terry et al. | |
| 7,075,203 B2 | 7/2006 | Kuwert | |
| 7,131,398 B2 | 11/2006 | Cohen et al. | |
| 7,148,598 B2 | 12/2006 | Ionel et al. | |
| 7,268,505 B2 | 9/2007 | Pant et al. | |
| 7,272,302 B2 | 9/2007 | Woodward et al. | |
| 7,296,753 B1 | 11/2007 | Zucker | |
| 7,327,118 B2 | 2/2008 | Pant et al. | |
| 7,378,821 B2 | 5/2008 | Simpson, III | |
| 7,443,119 B2 | 10/2008 | Liu | |
| 7,458,228 B2 | 12/2008 | Lagace et al. | |
| 7,590,334 B2 | 9/2009 | Yabusaki et al. | |
| 2001/0048261 A1 | 12/2001 | Kojima et al. | |
| 2002/0047348 A1 * | 4/2002 | Ohiwa et al. | 310/68 B |
| 2002/0121837 A1 | 9/2002 | Dombrovski et al. | |
| 2003/0001442 A1 * | 1/2003 | Hsu | 310/68 R |
| 2003/0080772 A1 | 5/2003 | Giacomini et al. | |
| 2003/0173924 A1 * | 9/2003 | Blase et al. | 318/538 |
| 2004/0095035 A1 * | 5/2004 | Sogabe et al. | 310/216 |
| 2004/0232871 A1 | 11/2004 | Deck et al. | |
| 2005/0001502 A1 | 1/2005 | Yamazaki et al. | |
| 2005/0029976 A1 | 2/2005 | Terry et al. | |
| 2005/0116392 A1 | 6/2005 | Vesci et al. | |
| 2005/0162108 A1 | 7/2005 | Pant et al. | |
| 2005/0194918 A1 * | 9/2005 | Takeuchi | 318/135 |
| 2005/0253744 A1 | 11/2005 | Kern | |
| 2006/0113856 A1 | 6/2006 | Tanno et al. | |
| 2006/0113857 A1 | 6/2006 | Honkura et al. | |
| 2006/0186751 A1 | 8/2006 | Kim et al. | |
| 2006/0244333 A1 * | 11/2006 | Jeung | 310/186 |
| 2006/0291820 A1 | 12/2006 | Kobayashi | |
| 2007/0024250 A1 | 2/2007 | Simpson, III | |
| 2007/0046124 A1 | 3/2007 | Avdin et al. | |
| 2007/0247091 A1 | 10/2007 | Maiocchi | |
| 2008/0084171 A1 | 4/2008 | Leehey et al. | |
| 2008/0313884 A1 | 12/2008 | Jeung | |
| 2008/0315691 A1 | 12/2008 | Jeung | |
| 2009/0039807 A1 | 2/2009 | Yabusaki et al. | |
| 2009/0039820 A1 | 2/2009 | Milano et al. | |
| 2009/0058202 A1 | 3/2009 | Jeung | |
| 2009/0102305 A1 | 4/2009 | Lu | |
| 2009/0108686 A1 | 4/2009 | Jeung | |
| 2009/0267549 A1 | 10/2009 | Kitagawa | |
| 2009/0284201 A1 | 11/2009 | Jeung | |
| 2010/0225257 A1 | 9/2010 | Masfaraud et al. | |

FOREIGN PATENT DOCUMENTS

| | | | |
|---|---|---|---|
| FR | 2 896 638 A | | 7/2007 |
| GB | 2015266 A | | 9/1979 |
| JP | 54001810 A | * | 1/1979 |
| JP | 55071162 A | * | 5/1980 |
| JP | 56117567 A | | 9/1981 |
| JP | 56157249 A | | 12/1981 |
| JP | 58112449 A | | 7/1983 |
| JP | 58119754 A | * | 7/1983 |
| JP | 01-129741 A | | 5/1989 |
| JP | 5300770 A | | 11/1993 |
| JP | 06086485 A | | 3/1994 |
| JP | 2001268831 A | | 9/2001 |
| JP | 03248248 B2 | | 1/2002 |
| JP | 2004-023823 A | | 1/2004 |
| JP | 2004-56887 A | | 2/2004 |
| JP | 2004-304928 A | | 10/2004 |
| JP | 2005-168241 A | | 6/2005 |
| KR | 10-2006-0115930 A | | 11/2006 |
| KR | 10-0696854 B1 | | 3/2007 |
| KR | 10-2008-0019807 A | | 3/2008 |
| WO | 2009-140419 A2 | | 11/2009 |

\* cited by examiner

FIG. 1 [PRIOR ART]
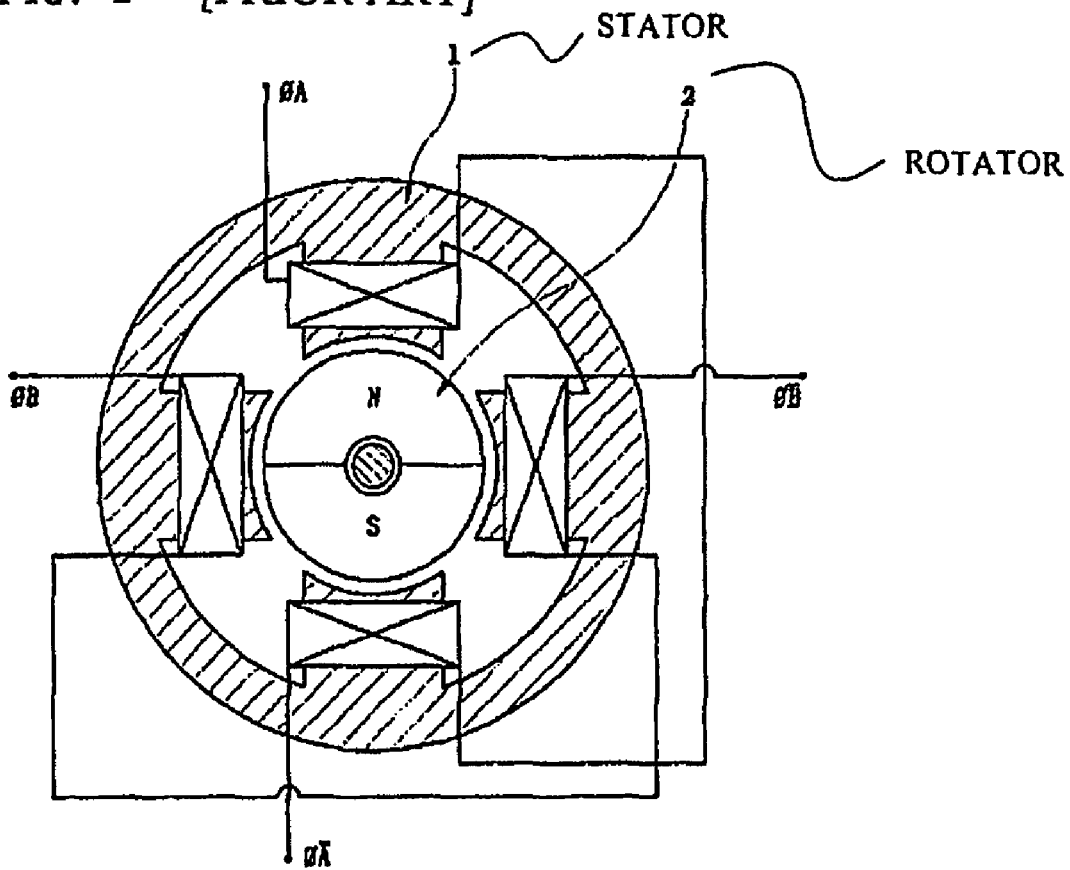
FIG. 2 [PRIOR ART]
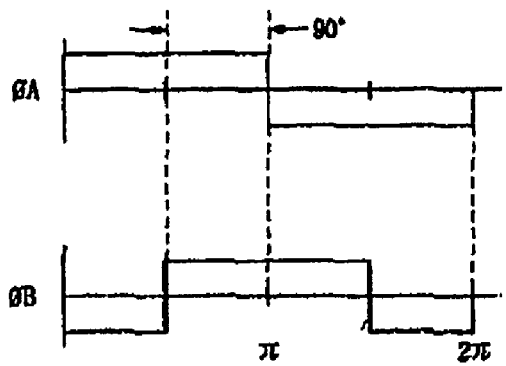

FIG. 3  [PRIOR ART]
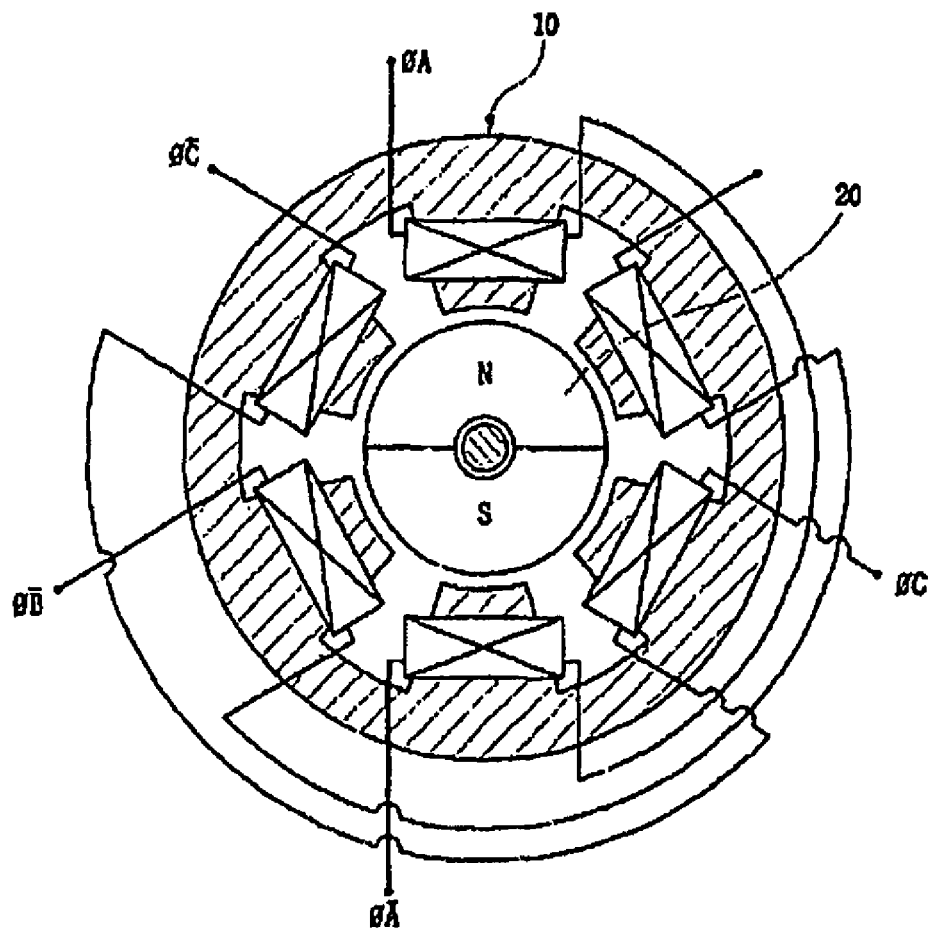
FIG. 4  [PRIOR ART]
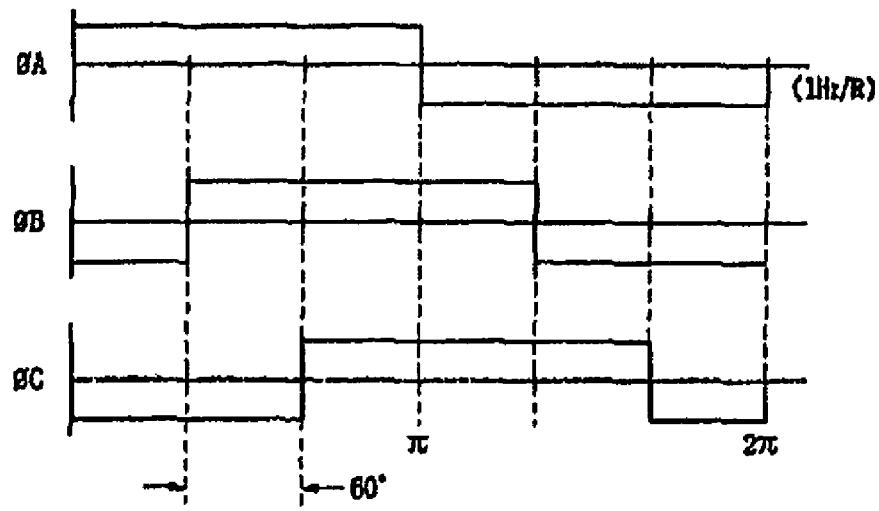

TWO-PHASE BRUSHLESS DC MOTOR

CROSS-REFERENCE TO RELATED APPLICATIONS

This application claims the benefit of Korean Application No. 10-2005-035861 filed Apr. 29, 2005 in the Korean Intellectual Property Office, the disclosure of which is incorporated herein by reference.

BACKGROUND OF THE INVENTION

1. Field of the Invention

The present invention relates to a brushless motor, and in particular to a two-phase brushless DC motor, which produces rotation torque having a phase difference of 30 degrees with two-phase brushless motor driving current having 90 degrees phase difference to result in a reduction in the torque pulsation in a brushless motor and an improvement in the starting torque, and also increases a permeance coefficient of the rotor magnetic circuit over that of the brushless motor rotor having a phase difference of 60 degrees to thereby improve the efficiency of the motor.

2. Description of the Related Art

In general, a brushless motor refers to a DC motor which modifies a rectifier equipped with a brush as a mechanical part into an electric means.

Accordingly, it has been studied and developed in various fields because no wear, no dust, and no electric noise is produced and it is good for output and efficiency to make it adapted to high speed rotation type motor.

In this brushless motor, the rotor of the DC motor around which coils are wound is substituted with a permanent magnet, and the speed control method has been changed from a voltage control type into a magnetization phase control type to thereby require a driving circuit.

Further, the brushless motor in general comprises a rotor made of permanent magnet and a stator which is magnetized by rectified electric voltage of an electronic switching circuit.

The two-phase brushless motor is driven with the magnetization angle having 90 degrees phase difference, is comprised of a rotor made of permanent magnet having 2×n poles and a stator having 4×n pole windings.

Meanwhile, the three-phase brushless motor is driven with the magnetization angle having 60 degree phase difference, and is comprised of a rotor made of permanent magnet having 2×n poles and a stator having 6×n pole windings.

FIG. 1 is a view for showing rotation power transformation construction of a conventional two-phase brushless motor, and FIG. 2 is a diagram of a wave shape of a rotation torque for showing a driving step or operation of the conventional two-phase brushless motor.

As shown in FIG. 1, a conventional two-phase brushless motor comprises a basic rotor 2 with two poles and a stator 1 having four pole windings.

The thus constructed two-phase brushless motor produces rotation torque having 90 degree phase difference as shown in FIG. 2.

In this instance, as winding current flows between 0 and 180 degrees and big current flows between 0 and 45 degrees due to small counter electromotive forces, it is necessary to take note of a driving circuit and the angle of a torque ripple is big.

Furthermore, it is preferable to shorten the distance between poles of the permanent magnets in the rotor 2 and broaden a pole area of the stator 1 to correspond to that of the permanent magnet of the rotor 2 and decrease air gap defined there-between so that it is possible to make use of the magnetic energy to the maximum by increasing the permeance coefficient of the motor magnetic circuit.

However, since the two-phase brushless motor cannot but to be comprised of the rotor 2 having 2×n poles and a stator 1 having 4×n pole windings, the distance between poles of the permanent magnets in the rotor 2 is relatively large in comparison with that of the pole windings of the stator 1, and the pole area of the stator 1 corresponding to that of the permanent magnet of the rotor 2 is small to result in a small permeance coefficient and low utilization efficiency of the magnetic energy.

Therefore, according to thus two-phase brushless motor, it is not adaptable to a large size motor because it is great in torque ripple and small in electromotive torque.

FIG. 3 is a view for showing rotation power transformation construction of a conventional three-phase brushless motor, and FIG. 4 is a diagram showing a wave shape of a rotation torque for illustrating a driving step of the conventional three-phase brushless motor.

Meanwhile, as shown in FIG. 3, the conventional three-phase brushless motor is comprised of a basic rotor 20 with two poles and a stator 10 with 6 polar windings.

As shown in FIG. 4, the three-phase brushless motor produces rotation torque having 60 degrees phase difference, and winding current flows between 0 and 120 degree and a torque ripple angle having small counter electromotive force exists between 0 and 30 degree.

However, although the three-phase brushless motor is more advantageous than the two-phase brushless motor, since it cannot but to be comprised of the rotor 20 having 2×n poles and the stator 10 having 6×n pole windings in construction, the distance between poles of the permanent magnets in the rotor 20 is long, and the pole area of the stator corresponding to that of the permanent magnet of the rotor 20 is small to result in a small permeance coefficient and low utilization efficiency of the magnetic energy.

Although the two-phase or three-phase brushless motor is driven through or by a wave bipolar magnetization, which is a conventional optimum driving method, limitations have exist in utilizing the magnetic energy to the maximum in view of the principal structure, and structural problems arise in improving efficiencies.

SUMMARY OF THE INVENTION

Additional aspects and/or advantages of the invention will be set forth in part in the description which follows and, in part, will be apparent from the description, or may be learned by practice of the invention.

Accordingly, the present invention has been made to overcome the conventional problems and limitations, and according to an aspect of the present invention, a two-phase brushless motor is provided which can improve large rotation torque features and efficiency by way of providing a permanent magnetic rotor having a greater number of divided poles than that of the windings of a stator to thereby maximize utilization efficiency of the magnetic energy of the motor and to minimize phase difference of the rotation driving of the motor to be 30 degrees.

Further, another aspect of the present invention is to provide a two-phase brushless motor which can utilize effective magnetic energy to the maximum by way of providing a rotor having 6×n poles, which is three times the poles of the two or three-phase motor having 2×n basic poles, to thereby increase permeance coefficient of the permanent magnet of the rotor, and by way of providing a stator having 4×n winding poles to thereby assure stator poles having an area identical with the opposing area of the permanent magnet pole of the rotor to result in the increase of the permeance coefficient of the operation point. It is also understood that a stator having 4×n winding poles to thereby assure a stator pole having an area similar with the opposing area of the permanent magnet pole of the rotor to result in the increase of the permeance coefficient of the operation point Still another aspect of the present invention is to provide a two-phase brushless motor which can reduce copper loss and production cost by way of providing an auxiliary salient pole between respective winding poles of the stator to thereby constitute a magnetic circuit, which is capable of minimizing the cogging arising from the interaction between the rotors having 6×n poles, and minimizing the windings of the stator in comparison with the rotor pole to be 4×n.

According to an aspect of the present invention, there is provided a two-phase brushless motor comprising: a two-phase winding stator provided with 4×n winding poles; and auxiliary poles formed between the respective winding poles and a rotor constituted of 6×n permanent magnet rotation poles having identical divided angles. It is also understood that the auxiliary poles formed between the respective winding poles and a rotor constituted of 6×n permanent magnet rotation poles having predetermined angles.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a view for showing rotation power transformation construction of a conventional two-phase brushless motor;

FIG. 2 is a diagram showing a wave shape of a rotation torque for illustrating a driving step of the conventional two-phase brushless motor;

FIG. 3 is a view for showing rotation power transformation construction of a conventional three-phase brushless motor;

FIG. 4 is a diagram showing a wave shape of a rotation torque for illustrating a driving step of the conventional three-phase brushless motor;

DETAILED DESCRIPTION OF THE PREFERRED EMBODIMENTS

Figure 5:
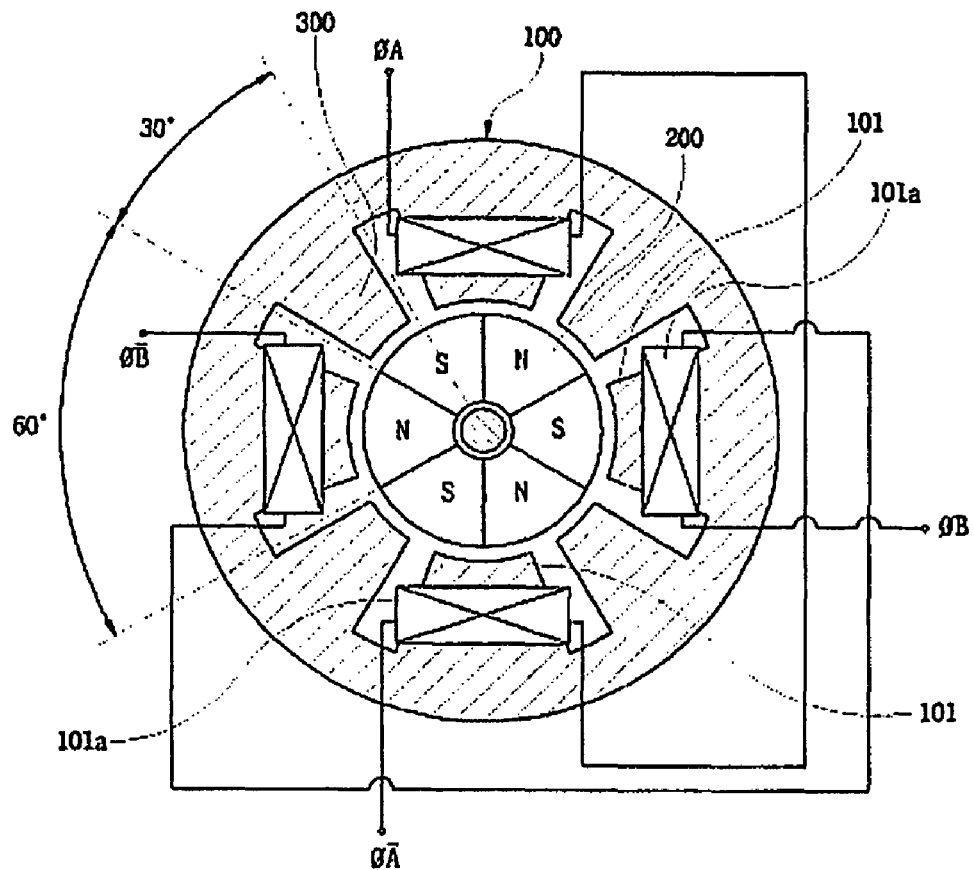
FIG. 5 is a view for showing rotation power transformation construction of a two-phase brushless motor (4S6R) according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

According to the present invention, there is provided a brushless motor fabricated by including a stator having 4×n poles and a permanent magnet rotor having 6×n poles, based on a motor constitution combined by a two-phase winding stator provided with four winding poles and a permanent magnet rotor provided with six poles divided into 60 divided degrees.

Figure 6:
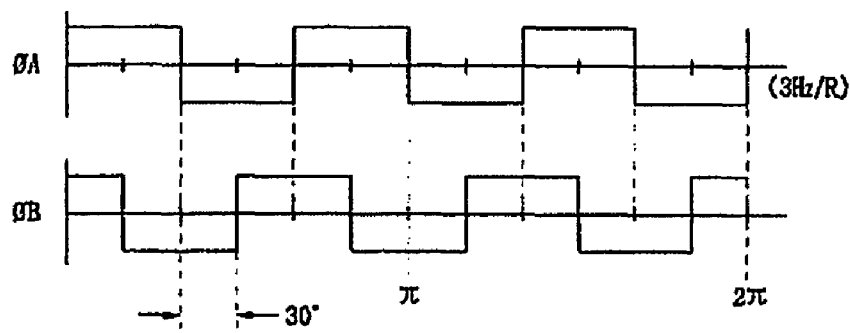
FIG. 6 is a diagram showing a wave shape of magnetization current for driving the two-phase brushless motor according to an embodiment of the present invention.
Figure 7:
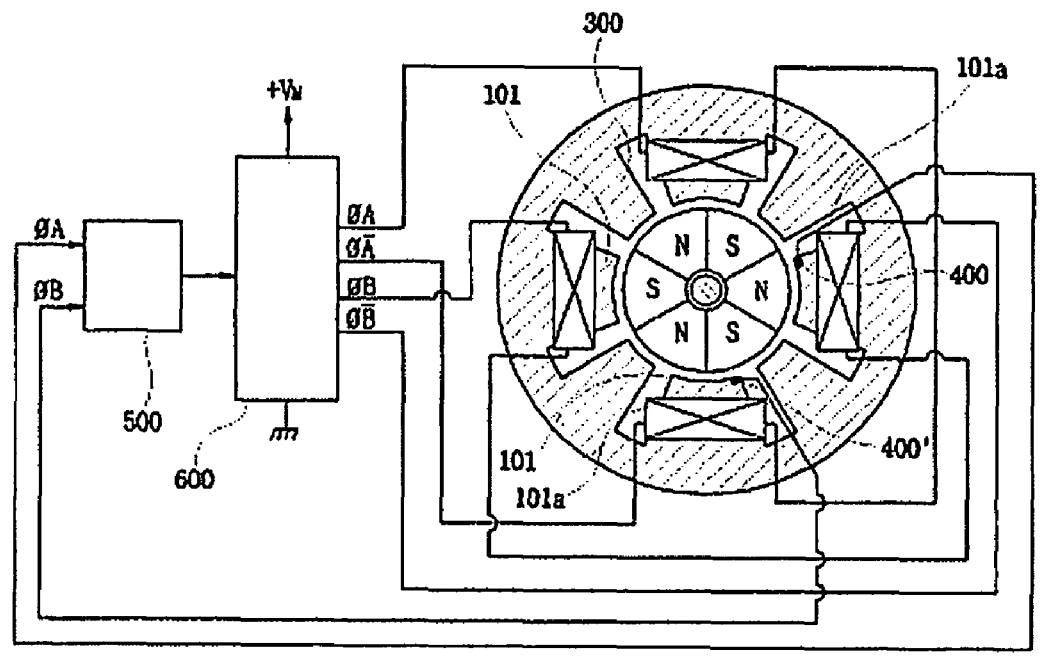
FIG. 7 is a view for showing an example of a driving circuit in the two-phase brushless motor according to an embodiment of the present invention.

From now on, the constitution and action of the present invention will be described in detail in connection with FIGS. 5 to 7 showing the exemplary brushless motor including four poles stator windings and six poles rotor poles (4S6R) according to an aspect of the present invention.

As shown in FIG. 5, the brushless motor of the present invention includes a stator 100 constituted of four two-phase windings, a rotor 200 constituted of permanent magnets divided into 60 degrees, and four auxiliary poles 300 provided between respective winding poles 101 of the stator 100, wherein the stator 100 is provided with winding poles 101, which correspond to a split surface of a pole in the permanent magnet of the rotor 200 and are arranged at respective positions divided into 90 degrees.

With regard to an embodiment of the present invention, the stator 100 includes four two-phase windings 101a formed at respective winding poles 101, each of which is arranged at a position divided by 90 degrees and corresponds to the divided surface of the rotor permanent magnet having divided angles of 60 degrees.

Accordingly, as marginal angles of 30 degrees are provided between the winding pole 101 and adjacent winding pole 101, the auxiliary poles 300 are provided within the marginal angles formed between the winding poles 101 of the stator 100, and a surface peripheral length of the auxiliary pole 300 is chosen to be a length excluding space for allowing insertion of winding coils, such as excluding 2~3 mm.

The rotor 200 is constituted by six permanent magnet poles having respective 60 degrees divided angle, each of which is arranged alternately by an N pole and an S pole.

The winding 101a of the stator 100 is fabricated by inserting two-phase windings ΦA, ΦB having phase difference of 90 degrees into a slot of the winding pole 101.

As shown in FIG. 6, the two-phase brushless motor equipped with the above described auxiliary pole according to an embodiment of the present invention, the magnetization current features that respective phase has phase difference of 30 degrees/step, and features that it has a switching frequency of 3 Hz/phase per one rotation.

Consequently, as described above, according to an embodiment of the present invention, very stable rotation torque and starting features are obtained because a rotation step angle of the preferred embodiment is smaller than that of the three-phase brushless motor having a phase difference of 60 degrees/step as shown in FIG. 4, and magnetization current features of the two-phase brushless motor having conventional phase difference of 90 degrees/step as shown in FIG. 2.

As the two-phase brushless motor of the present invention includes the 4×n stator and the 6×n rotor, according to the present invention, there is provided a motor combined by the eight poles stator and twelve rotor magnet having 30 degrees divided poles or a motor combined by twelve poles stator and eighteen rotor magnet having 20 degrees divided poles.

FIG. 7 is a view for showing construction of a driving circuit of the two-phase brushless motor according to an aspect of the present invention.

As shown in FIG. 7, the driving circuit for driving the two-phase brushless motor of the present invention includes sensors 400, 400' for detecting positions of the rotor, a two-phase logic circuit 500 for driving two-phase magnetization switching signals based on the detected positions of the rotor, and a switching circuit 600 for driving the motor through applying electric current to a two-phase windings of the stator 100 according to the two-phase magnetization switching signals of the two-phase logic circuit.

Figure 8:
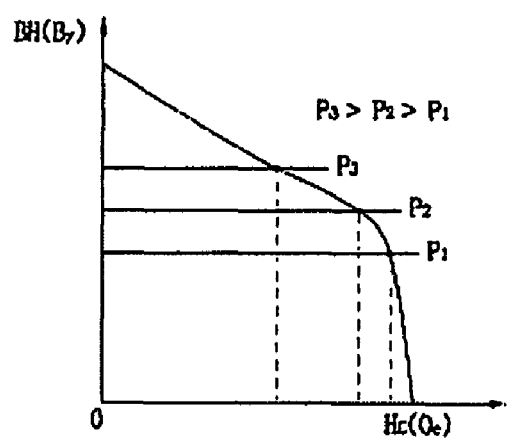
FIG. 8 is a view for showing a permeance coefficient of the brushless motor according to an embodiment of the present invention.

FIG. 8 is a view for showing a permeance coefficient of the brushless motor of the present invention.

As shown in FIG. 8, the permeance coefficient P3 of the permanent magnet rotor having more divided poles than the winding poles of the stator of the present invention is greater than that of the conventional two-phase brushless motor because the distance between the poles of the simple magnet becomes shorter, and is greater than that of the conventional three-phase brushless motor to thereby facilitate effective design of the motor capable of utilizing available magnet energy of the motor.

As described above, according to the two-phase brushless motor of the present invention, it is possible to obtain rotation torque angle more minutely divided than that of the three-phase brushless motor by using the driving means of the two-phase brushless motor to thereby accomplish stable and strong starting torque and rotation features, in particular it is possible to obtain very high efficiency feature at mid and low rotation speed of the motor.

Furthermore, according to the present invention, it is possible to efficiently utilize available magnet energy so that the winding mass of the coils in the stator can be reduced to thereby decrease volume and weight of the motor, resulting in a reduction of the production cost and an improvement in economical efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A 2-phase electric motor comprising:
a stator comprising a plurality of electromagnetic poles and a plurality of auxiliary poles, wherein the plurality of electromagnetic poles are provided in a multiple of four, wherein first and second electromagnetic poles are positioned opposite each other and wherein third and fourth electromagnetic poles are positioned opposite each other, wherein the plurality of auxiliary poles are provided in a multiple of four, wherein at least one of the auxiliary poles is interposed between two of the electromagnetic poles that are angularly closest to each other among the plurality of electromagnetic poles;
a rotor comprising a plurality of permanent magnet poles configured to magnetically interact with the electromagnetic poles and the auxiliary poles so as to rotate the rotor relative to the stator, wherein the plurality of permanent magnet poles are provided in a multiple of six; and
wherein each auxiliary pole comprises a tapered portion tapered in a radial direction of the rotor and has an angular width of about 30° throughout the tapered portion from a distal end to a proximal end thereof;
wherein the first electromagnetic pole has at least a first winding associated therewith and the second electromagnetic pole has at least a second winding associated therewith, and wherein the second windings are electrically connected to each other and are configured to receive a first electric signal;
wherein the third electromagnetic pole has at least a third winding associated therewith and the fourth electromagnetic pole has at least a fourth winding associated therewith, wherein the third and fourth windings are electrically connected to each other and are configured to receive a second electric signal,
wherein each of the first and second electric signals has 3 cycles per revolution of the rotor,
wherein the first and second electric signals have a phase difference of about 30°.

2. The motor of claim 1, wherein a first one of the auxiliary pole immediately neighboring the first electromagnetic pole is spaced from the first electromagnetic pole.

3. The motor of claim 1, wherein each auxiliary pole does not comprise a winding that is configured to carry an electric signal while operating the motor.

4. The motor of claim 1, wherein the electromagnetic poles and the auxiliary poles are integrated in a single piece.

5. The motor of claim 1, wherein each permanent magnetic pole has a substantially identical angular width about a rotational axis of the rotor.

6. The motor of claim 1, further comprising:
a first sensor positioned adjacent to the first electromagnetic pole and configured to sense the rotor's position relative to the first electromagnetic pole; and
a second sensor positioned adjacent to the second electromagnetic pole and configured to sense the rotor's position relative to the second electromagnetic pole.

7. A 2-phase electric motor comprising:
a stator comprising a plurality of electromagnetic poles and a plurality of auxiliary poles, wherein the plurality of electromagnetic poles are provided in a multiple of four, wherein first and second electromagnetic poles are positioned opposite each other and wherein third and fourth electromagnetic poles are positioned opposite each other, wherein the plurality of auxiliary poles are provided in a multiple of four, wherein at least one of the auxiliary poles is interposed between two of the electromagnetic poles that are angularly closest to each other among the plurality of electromagnetic poles;
a rotor comprising a plurality of permanent magnet poles configured to magnetically interact with the electromagnetic poles and the auxiliary poles so as to rotate the rotor relative to the stator, wherein the plurality of permanent magnet poles are provided in a multiple of six; and
wherein two of the auxiliary poles that are angularly closest to each other among the plurality of auxiliary poles are apart from each other with an angular gap therebetween, wherein the angular gap is about the same as an angular width of each permanent magnet pole of the rotor;
wherein each auxiliary pole comprises a tapered portion tapered in a radial direction of the rotor and has an angular width of about 30° throughout the tapered portion from a distal end to a proximal end thereof;
wherein the first electromagnetic pole has at least a first winding associated the and the second electromagnetic pole has at least a second winding associated therewith, wherein the first and second windings are electrically connected to each other and are configured to receive a first electric signal;
wherein the third electromagnetic pole has at least a third winding associated therewith and the fourth electromagnetic pole has at least a fourth winding associated therewith, wherein the third and fourth windings are electrically connected to each other and are configured to receive a second electric signal, wherein each of the first and second electric signals has 3 cycles per revolution of the rotor, wherein the first and second electric signals have a phase difference of about 30°.

8. The motor of claim 7, wherein a first one of the electromagnetic poles comprises a surface facing the rotor, wherein the surface has an angular width smaller than 60° about a rotational axis of the rotor.

9. The motor of claim 7, wherein a first one of the auxiliary poles comprises a surface facing the rotor, wherein the surface has an angular width smaller than 30° about a rotational axis of the rotor.

10. The motor of claim 7, wherein each permanent magnetic pole has a substantially identical angular width about a rotational axis of the rotor.

11. The motor of claim 7, further comprising:
a first sensor positioned adjacent to a first one of the electromagnetic poles and configured to sense the rotor's position relative to the first electromagnetic pole; and
a second sensor positioned adjacent to a second one of the electromagnetic poles and configured to sense the rotor's position relative to the second electromagnetic pole.

12. The motor of claim 7, wherein a first one of the auxiliary pole immediately neighboring the first electromagnetic pole is spaced from the first electromagnetic pole.

13. A 2-phase electric motor comprising:
a stator comprising a plurality of electromagnetic poles and a plurality of auxiliary poles, wherein the plurality of electromagnetic poles are provided in a multiple of four, wherein first and second electromagnetic poles are positioned opposite each other and wherein third and fourth electromagnetic poles are positioned opposite each other, wherein the plurality of auxiliary poles are provided in a multiple of four, wherein at least one of the auxiliary poles is interposed between two of the electromagnetic poles that are angularly closest to each other among the plurality of electromagnetic poles;
a rotor comprising a plurality of permanent magnet poles configured to magnetically interact with the electromagnetic poles and the auxiliary poles so as to rotate the rotor relative to the stator, wherein the plurality of permanent magnet poles are provided in a multiple of six; and
wherein each auxiliary pole comprises a tapered portion tapered in a radial direction of the rotor and has an angular width of about 30° throughout the tapered portion from a distal end to a proximal end thereof;
wherein the first electromagnetic pole has at least a first winding associated therewith, and the second electromagnetic pole has at least a second winding associated therewith, wherein the first and second windings are electrically connected to each other and are configured to receive a first electric signal;
wherein the third electromagnetic pole has at least a third winding associated therewith and the fourth electromagnetic pole has at least a fourth winding associated therewith, wherein the third and fourth windings are electrically connected to each other and are configured to receive a second electric signal,
wherein each of the first and second electric signals has 3 cycles per revolution of the rotor,
wherein the first and second electric signals have a phase difference of about 30°.

* * * * *